Patented May 20, 1941

2,242,250

UNITED STATES PATENT OFFICE 2,242,250

RESINOUS CONDENSATION PRODUCTS AND PROCESS OF MAKING THEM

Herbert Hönel, Vienna, and Alois Zinke, Graz, Austria, assignors, by mesne assignments, to Reichhold Chemicals, Inc., Detroit, Mich., a corporation of Delaware No Drawing. Original application July 6, 1935, Serial No. 30,152. Divided and this application May 8, 1937, Serial No. 141,554. In Austria July 17, 1934

11 Claims. (Cl. 260—51)

The invention relates to the condensation products or resins formed by the reaction of high molecular phenolic bodies, more particularly terpene phenols, with carbonyl compounds, particularly formaldehyde, which condensation products may be used for the preparation of varnishes, or may serve as heat hardening plastic masses having wide utility.

The present application is a division of our application Serial No. 30,152 filed July 6, 1935, now Patent No. 2,123,898, wherein are claimed those terpene phenols which are employed for the preparation of the condensation products claimed in the present application.

In carrying out the process of our invention we start from the following materials:

1. Alicyclic compounds or such acyclic aliphatic compounds which readily convert into alicyclic compounds or which are readily obtained from alicyclic compounds by common treatments, such as heating.

2. Phenols such as common phenol or its easily available homologues, such as cresols, xylenols or dioxybenzenes or partial ethers thereof, such as guaiacol or polynuclear benzenes, such as naphthols. The condensation products obtained from the interaction of 1. and 2. may be reacted with:

3. Carbonyl compounds, particularly formaldehyde in the most various ways.

The term terpene will be used in the following description and claims for the compounds mentioned under heading 1 and is intended to comprise:

(1) Terpenes in the restricted sense of the term and such oxygen-free or oxygen-containing, saturated or unsaturated compounds as immediately derive therefrom: (a) hydrocarbons such as limonene, pinene, camphene, having the general formula $C_{10}H_{16}$; menthene, menthane, pinane, camphane, carane; (b) hydroxy compounds and simple derivatives thereof e. g. menthol, terpine, terpineol, borneol; (c) other oxygen compounds more particularly carbonyl compounds: cineol, menthone, pulegone, carvone, etc.

(2) Sesquiterpenes and oxygen-free or oxygen-containing, saturated or unsaturated compounds which immediately derive therefrom: (a) e. g. cedrene, cadinene; (b) and (c) analogous to (1) e. g. cedrol, santalol.

(3). Di- and polyterpenes as well as their oxygen compounds; e. g. abietic acid, coniferyl alcohol.

(4) Acyclic compounds which readily derive from or may readily be converted into compounds belonging to the classes mentioned under headings (1) to (3) and including (a) so called "terpenogenes" or "olefinic terpenes" in the narrow sense of the term and oxygen-containing simple derivatives thereof: e. g. isoprene, geraniol, linalool, terpinehydrate, citral; (b) compounds of undefined constitution deriving from substances of the aforesaid classes (particularly those mentioned under headings (2) and (3)), mainly by means of heat treatments or other simple chemical conversions; in many cases these substances constitute cheap waste products.

These compounds are characterized in that they readily form halogen compounds. Suitable halogen compounds are obtained most economically by addition of halogen or hydrogen halides on unsaturated compounds, which addition may or may not be accompanied by simultaneous molecular re-arrangement; or by conversion such as esterification of oxygen-containing compounds with hydrogen halides. From compounds of saturated nature they are formed by substitution with halogen, such as readily takes place at one or several places due to the particular molecular constitution of the terpenes. They may also be obtained by addition, conversion and/or substitution. Unsaturated compounds in which a tertiary carbon atom is connected by a double linkage with another C atom (as illustrated by the grouping

are particularly suitable since they form tertiary halogen compounds (halides) by addition of hydrogen halides; such intermediary products lead to particularly valuable high molecular phenols.

There are many easily available materials which at least contain a high percentage of such chemically strictly determined terpenes as mentioned above. We wish to mention oils of turpentine deriving from natural balsams or from the manufacture of cellulose; dipentenes, conifer oils, pine oil, cumin oil (caraway seed oil), oil of camphor, lemongrass oil, oil of bergemott, gum rosin or wood rosin as well as esters thereof, and other more or less neutral natural soft resins, various decomposition (depolymerisation)-products of rubber, rosin oils, copal oils, tall oil and other decomposition-products, by-products or waste-products.

According to our invention one or more members of the first group (hereinafter briefly referred to as terpenes or terpene compounds or terpene-like compounds) are chemically combined with one or more members of the second group preferably by producing halogen compounds, such as by addition or other interaction from suitable terpene compounds and hydrogen halides and causing these products to react with the members of the second group i. e. the phenols in the presence of aluminum chloride, zinc chloride, ferric chloride or other suitable metal halides or substances which form the same under the conditions of the reaction, such as zinc or iron dust.

This chemical combination is based on a condensation reaction and accompanied by the formation of hydrogen halide. The condensation products obtained are to be regarded as monovalent or polyvalent more or less high molecular phenols in which one or several phenolic benzene rings are chemically fixed in the terpene. They will be hereinafter briefly referred to as "high-molecular phenols" or "terpene phenols."

For our preferred process we either first prepare the hydrogen halide addition or conversion products separately or in the presence of the phenol, or we form them intermediately by means of the hydrogen halides set free during the condensation. Hydrogen halide which has been set free by reacting the phenol with any other suitable organic halogen compound, such as a tertiary alkyl halide or benzyl chloride or the like, may also be used for this intermediate formation. In this case the aforesaid organic halogen compounds serve as additional auxiliary material for initiating the condensation between the phenol and the terpene-like compound.

The last mentioned method of forming hydrogen halide addition or conversion products in the presence of phenols, are limited to terpene-like compounds which in the course of the reaction of the hydrogen halide do not form water, such as would render the catalyst inactive or at least would have a very detrimental effect thereon.

However, also in the case of terpene compounds which, like pure hydrocarbons, do not form water with hydrogen halides, the separate preparation of the addition products or other conversion products offers the considerable advantage that the latter can be freed by distillation or crystallization (freezing out) etc. from non-converted or inert fractions or particularly from dark colored by-products and other impurities. When proceeding in this way we obtain particularly light colored terpene-phenols.

If alcoholic compounds, such as borneol, terpineol, terpin hydrate or the so-called pine oil which contains a high percentage of substances of alcoholic nature, are used as starting materials, light colored halides as a rule are also obtained without distillation. When using terpene-like compounds of the latter kind a separate preparation of the halides is positively necessary owing to the simultaneous formation of water.

For the sake of completeness we wish to mention that in some cases (which, as stated above, are restricted to non-alcoholic terpenes) the condensation reaction may be performed by means of aluminum chloride, or the like, alone. The hydrogen halide necessary for initiating the condensation reaction, is formed from the aluminum chloride since traces of water are generally present.

We are able to control our process so as to obtain condensation products of varied character by suitably choosing the starting materials and their proportions, the catalyst, the temperature, the duration and other conditions.

By employing relatively small quantities of the phenol particularly when condensing during a relatively short time and when employing small quantities of the catalyst, as a rule soft or even only viscous terpene phenols are obtained. By employing relatively large quantities of the phenol, particularly when extending the duration of condensation and when increasing the proportions of the catalyst, solid resinous, and in individual cases even crystalline substances as a rule are obtained. The latter, however, retain resinous by simple heating. In these solid main resinous by simple heating. In these solid compounds the proportion of combined phenol is also relatively high.

Unexpectedly we have found that the terpene-phenol condensation products which, when first formed, are in an oily or soft condition and which contain a relatively large proportion of combined terpene or the like, can also be converted into resinous solid products, particularly if being of unsaturated character. This conversion probably is caused by polymerization; we effect it by heating for a particularly long period, preferably in the presence of increased quantities of catalysts. As suitable catalysts there are to be regarded both the hereinbefore mentioned metal halide and the hydrogen halide formed by the condensation and retained in the reaction mixture. Products may be obtained which, notwithstanding a relatively small proportion of combined phenol, indicate the presence of several phenolic benzene nuclei in the molecule. They behave very similarly to terpene-phenols which are obtained from polyvalent terpene halides and phenol, the latter being preferably employed in excess, and which themselves are to be regarded as polyvalent polynuclear phenolic compounds.

The hereinbefore described method of carrying out our process is particularly advantageous because in this way it is also possible to compound practically all the phenol. Without employing a relatively large excess of terpene compound or its suitable halogen compound, uncombined phenol as a rule remains behind and must be removed by washing or by steam or vacuum distillation in order to avoid a disturbing behavior of the product obtained.

On the other hand the process may be modified by further treating the halogen compounds obtained by addition or conversion with hydrogen halide, before condensation with phenols, with halogen. Easily exchangeable hydrogen atoms are substituted by this treatment and in this way terpene derivatives particularly rich in halogen are readily obtained which in turn give rise to the formation of terpene phenols containing a particularly high proportion of combined phenol. The hydrogen halide formed in the course of substitution of the hydrogen which is exchanged, may be used for the formation of new hydrogen halide addition products, etc. of terpenes.

A particular advantage of our process resides in the fact that phenolic compounds may be obtained, which show a very high fastness to light and are not accompanied by disturbing yellowing phenomena. This is of particular importance in the case of substances which are to be used directly or indirectly in the manufacture of varnishes or lacquers. Properties as aforesaid as a rule are obtained, if tertiary halides or poly-halides are formed by addition or interaction from terpene compounds or allied compounds and hydrogen halide or halogen.

For recapitulation we wish to state that the first step of our process leads to more or less high molecular phenolic compounds. These contain one or more aromatic nuclei which carry one or more phenolic hydroxyl groups. The aromatic nuclei are bound to more or less high molecular complexes which mostly consist of carbon and hydrogen atoms exclusively and which belong to the acyclic aliphatic series or, in the majority of cases however to the alicyclic series. The introduction of aromatic nuclei having phenolic hydroxyl group or groups is effected by first forming from terpenes, sesquiterpenes, polyterpenes or derivatives, or from terpenogenes, or from technical decomposition products of terpenes or polyterpenes, halogen compounds having one or more readily substitutable halogen atoms; these compounds are reacted with phenols according to any suitable method described above.

While we prefer these methods which are according to the principle of the Friedel-Crafts-synthesis, we wish it to be understood that also other methods may lead to the formation of those high molecular phenolic compounds as defined above which we aim to obtain. We mention the Koenigs method according to which unsaturated hydrocarbons are reacted with phenols in the presence of sulphuric acid and glacial acetic acid. Probably by addition acidic esters of sulphuric acid are formed intermediately which esters react in a manner more or less similar to halides. This method, however, is disadvantageous since the sulphuric acid readily reacts with phenols on substitution since the acidic sulphuric esters readily yield alcoholic compounds. Further this method tends to the formation of phenol-ethers and esters due to the presence of said alcoholic bodies or of the acetic acid. For these reasons very considerable amounts of water-soluble indifferent by-products are formed which affect the interaction products in a disturbing way while the yield of the desired phenolic high molecular compounds is only a poor one. The reaction products are mainly of oily or viscous consistency while solid resinous interaction products are with difficulty obtained, which products are far from crystalline in character. Particularly disadvantageous are dark colored or even black resinification products of indifferent chemical behavior. They are formed from the unsaturated hydrocarbons by the action of sulphuric acid and cannot be eliminated by washing or the like. Also a purification, e. g. by distillation in vacuo, is not possible, since generally the high-molecular phenols which are aimed at cannot be distilled without decomposition.

Somewhat better is the Schrauth method according to which unsaturated compounds are reacted with phenols with the aid of hydrogen chloride and glacial acetic acid. But according to this method also the yield of the desired phenolic compounds generally is a poor one and disturbed by the formation of undesirable by-products, such as ester-like compounds.

In single cases a compounding of unsaturated terpenes as e. g. turpentine or rosin with phenols may also be effected with gaseous or aqueous hydrochloric acid without other auxiliary materials.

From the aforesaid discussion it appears that the phenolic bodies obtained are of oily up to resinous solid character; in certain cases they are also of crystalline nature dependent on the nature of the starting materials, the proportions employed and on the method, the catalyst and its proportion, the temperature, the duration of condensing etc. employed. The phenolic bodies are readily soluble in the usual solvents, such as alcohols, hydrocarbons of any kind, chlorinated, ester- or ether-like solvents. Due to their ready solubility in fatty oils we employ them for the preparation of varnishes and lacquers particularly of oil-varnishes.

The pronounced phenolic character exerts a polymerization-delaying action on drying oils. Even China-wood oil can be heated for an unusually long time to the usual polymerization temperatures (i. e. 280° C. or more) in the presence of the resin without coagulating. Owing also to a further specific action of the resins we obtain wood oil varnishes which are completely gas-proof, i. e. which dry smooth under the severest conditions. Another desirable characteristic of the product is the absence of yellowing phenomena, which are disturbingly noticeable in most phenol-deriving artificial resins particularly during the drying of oil varnishes obtained therefrom. These properties render the resinous high molecular phenols valuable raw materials for varnishes.

The applicability of our process may be extended very considerably by subjecting to condensation with carbonyl compounds the high molecular phenols which are obtained according to any of the ways described above. We prefer the employment of formaldehyde, for condensation products of particular technical value may be obtained showing the most various properties. These depend on the proportions, the catalyst, temperature and duration of the reaction and on other controllable conditions. The variability is far broader than otherwise known when condensing phenols with aldehydes.

In order to facilitate the mutual contact between the high molecular phenols, particularly such of solid resinous nature, and the aldehyde etc., particularly aqueous formaldehyde, we prefer to employ as auxiliary materials indifferent solvents, such as saturated or aromatic hydrocarbons or alcohols, which may be removed after condensation has taken place.

It is particularly advantageous to condense the high molecular phenols with formaldehyde at ordinary or only moderately elevated temperatures for a prolonged period of time by means of a strong alkali and subsequent neutralization. Also in this case the employment of indifferent solvents as auxiliary materials is advisable in order to promote or at least to facilitate the mutual contact. The time necessary for chemically combining the two components depends upon the quantity of formaldehyde we wish to be compounded, or upon the quantity employed, upon the temperature, upon the quantity of the alkaline catalyst and its intensity, but it depends also upon the reactivity of the high-molecular phenol. The time may vary between one day up to several weeks. When condensing at approximately room temperature the condensation products obtained are to be considered as the corresponding phenolalcohols and polyalcohols originated from one molecule or several molecules of formaldehyde compounded per each molecule of the high molecular phenol. We prefer to carefully remove the alkaline catalyst by acidifying or neutralizing, but in special cases part at least of the alkaline catalyst may remain in the condensation product.

While we prefer to employ aqueous formaldehyde on account of its relatively low price we wish it to be understood that the same may be replaced by its anhydrous polymeric forms wholly or in part.

For illustration we wish to describe the behavior of the di-hydroxy-di-phenyl-menthane (diphenol-menthane) when subjected to different methods of condensing with formaldehyde. This high molecular phenol may be considered as a typical representative obtainable according to our process.

It may be readily prepared from technical dipentene by preparing the hydrogen-halide double addition product and combining the same with phenol, preferably in excess, in the presence of suitable catalysts, such as aluminum chloride, or zinc chloride, or the like. The di-hydroxy-diphenyl-menthane may also be obtained in crystalline form and be purified by recrystallisation.

When condensing the crystalline diphenol-menthane with 0.3–0.35 part of formaldehyde (40% vol.) with the aid of a strong mineral acid as catalyst, such as hydrochloric acid, suitably in the presence of inert solvents, we obtain an unusually hard and almost colorless resin of high melting point which resin remains permanently soluble and easily dissolves in alcohols, aromatic hydrocarbons and turpentine as well as in drying oils.

The aqueous formaldehyde may be replaced by a corresponding amount of anhydrous paraformaldehyde, the condensation being effected in the absence of solvents at temperatures above the melting point of the resin obtained.

By increasing the aqueous formaldehyde employed up to 0.4 part we obtain, assuming complete condensation, an insoluble infusible product.

This proportion of formaldehyde is very small as compared with the proportion usually employed when condensing common phenols to permanently soluble hard formaldehyde resins.

When replacing the crystalline diphenol-menthane by its resinous modifications similar condensation products are obtained.

When a weak alkali, such as ammonia is employed instead of the acidic catalyst, yellowish resins of similar solubility are obtained. But they do not show any considerable hardening capacity such as, however, is the case with condensation products obtained from common phenol or its homologues, particularly m-cresol, and formaldehyde, with the aid of ammonia.

Hardening resins are obtained when condensing the diphenol-menthane with 0.2 part or more of hexamethylene tetramine, suitably at temperatures above the melting point. The yellow color of the resins, however, renders such a mode of condensation far less desirable than the method described above consisting in the use of strong alkalies and subsequent neutralization. We prefer the latter method the more since aqueous formaldehyde may be employed which is far cheaper than its anhydrous modifications or hexamethylene tetramine.

The crystalline dihydroxy-diphenyl menthane is capable of fixing up to 4 mols. of formaldehyde, if the condensation is carried out in the presence of strong alkalies as contact agent and in a way as described above. This capability is positions are unoccupied in this high molecular phenol.

The condensation product obtained at low temperatures, which is to be considered as dihydroxy-diphenyl menthane tetra-alcohol is a solid, easily soluble and fusible resin which possesses an intense hardening capacity.

A similar behavior is peculiar to all condensation products obtained according to this particular process of our invention if in these condensation products high molecular phenols of the above indicated type derived from common phenol and having more than one phenol combined in the molecule, are compounded with a considerable excess of formaldehyde over the equimolecular quantity.

This refers e. g. to resinous menthane-diphenol compounds and other alicyclic or acyclic compounds substituted with phenol, which contain at least a considerable quantity of a polyphenol compound, when condensed with excess of formaldehyde according to this particular process.

By means of this process we also obtain formaldehyde condensation products showing a considerable hardening character when condensing high molecular phenols having combined only a relatively small proportion of phenol. Such a high molecular phenol, having, however, more than one phenol substituted in the molecule has been described above. We obtain it for example by reacting equimolecular quantities of phenol and dipentene (or even still more of the latter) in the manner described above, which consists in heating the soft or even liquid interaction product primarily formed, in the presence of the catalysts for a prolonged period of time, up to several days. Probably due to polymerization, the liquid or soft product is thereby converted into a solid resinous product having a far higher molecular weight. We even conclude from the distinct hardening character which is peculiar to the formaldehyde condensation product obtained, when operating in the described manner, that the solid resinous phenolic body contains several hydroxyphenyl groups in the molecule. In contradistinction thereto the still oily or soft interaction product primarily obtained from phenol and dipentene in the proportion as mentioned above, also when operating according to our particular condensation process, leads to products having little or no hardening capacity. We have stated that this particular condensation process generally permits of combining up to two mols. per each mol. of hydroxy-benzene fixed in the high molecular terpene phenol. Therefore the maximum amount of formaldehyde which can be compounded is dependent on the quantity of phenol fixed in the high molecular terpene phenol. This amount also depends on the constitution of the low molecular phenol which served to build up the high molecular one. E. g., high molecular phenols obtained from excess of o-cresol or technical mixtures of cresols, xylenols, etc., and dipentene-dihydrochloride which high molecular phenols are to be regarded as the corresponding di-ortho-cresol-etc.-menthanes are not capable of being compounded with such large proportions of formaldehyde as the diphenol-menthane mentioned above. When starting from o-cresol, etc., instead of from phenol the corresponding condensation products also exhibit only a relatively very poor hardening capacity although the high molecular phenol
due to the fact that four reaction favorable posi- is a solid resinous body.

On the other hand, it is easily to be understood that the hardening capacity also depends on the proportion of formaldehyde employed or chemically compounded with the high molecular phenol.

In the case of the diphenyl-menthane (which has been referred to hereinbefore as a typical representative of high molecular phenols having compounded several hydroxyphenyl-groups) an increase of the formaldehyde (40% vol.) employed over about equal parts by weight which corresponds to 4 mol. per 1 mol. of the diphenol-menthane or to 2 mol. per each phenol fixed therein does not increase the hardening capacity of the condensation product obtained (i. e. the tetra-alcohol as described above) but due to the mass action, only shortens the time necessary to form the same. On the other hand decrease of formaldehyde (40% vol.) employed or combined to less than about equal parts by weight causes also a decrease of the hardening capacity of the condensation product. When only about 0.4 part by weight, or less, is employed or combined, the condensation product obtained after neutralization etc. undergoes only a considerable rise of melting point when heated but does not become infusible. A very pale and hard resin is obtained on heating being similar to the resin which is obtained when condensing the diphenol-menthane with 0.4 part of formaldehyde (40% vol.) by means of a strong acidic catalyst as described already.

The hardening intensity of condensation products obtained according to the particular process from diphenol-menthane and suitable proportions of formaldehyde can also be influenced by the addition of catalysts known in the art, e. g. acids or alkalies, such as may remain from the condensation process by incomplete interaction.

The external appearance of the formaldehyde condensation products (phenol alcohols) which are obtained when operating in the described manner at low temperatures, after neutralizing and removing the solvents, if any present, is similar to the appearance of the high molecular phenols themselves.

With regard to the solubility properties of such formaldehyde condensation products the following may be mentioned: They are in general readily soluble in alcohols and ketones and as a rule also in benzene and its homologues. The products having a very pronounced hardening character, are as a rule insoluble in oil of turpentine, mineral spirit etc., and drying oils.

If condensation products as aforesaid are heated with drying oils, they pass over into absolutely insoluble condensation stages before appreciable quantities have gone into solution.

Formaldehyde condensation products, which have been obtained from a terpene phenol containing a relatively small quantity of combined phenol, are, however, as a rule soluble in drying oils. Many condensation products, as aforesaid, show a hardenable character, which is similar to that of the resinoids (heat hardening condensation products) described in U. S. Patents No. 1,800,295 or No. 1,800,296 and other divisional applications and patents deriving from one of the inventors of the present application. These resinoids are obtained in similar manner to the condensation products prepared according to the particular condensation process of our present invention, and are derived from phenols, in which only two of the reaction favorable positions (o, o and p to the phenolic hydroxyl group or groups) are unoccupied.

Terpene phenols which behave similar to the aforesaid distinct phenols, are e. g. obtained from the interaction of phenol with bornyl chlorides, in the way described above, or from about two parts of phenol with about 4-5 parts of dipentene and converting the primarily obtained soft interaction product into a solid resinous product in the way described above; or also from phenol with abietic acid, the interaction being performed e. g. with the aid of hydrochloric acid; such products also are obtained from the interaction of about equal parts of technical meta-cresol (60% m-, 40% p-cresol) with dipentene, the phenols having not entered into reaction being removed. Many other high molecular phenols having one or more phenolic benzene rings or hydroxyl groups, yield similar resinoids. It is very remarkable that many of these trepene phenols, although theoretically having more than two reaction favorable positions unoccupied, (which e. g. is the case in terpene phenols carrying a plurality of hydroxy-phenyl groups) behave like those distinct phenols having only two of the reaction favorable positions unoccupied, even when the maximum rate of formaldehyde is employed. This is probably due to the relatively very large atom complex in which the phenol molecules are fixed.

The condensation products obtained in the particular way from excess of formaldehyde and those high molecular phenols, examples of which are enumerated in the preceding paragraph, lead to highly viscous homogeneous masses when heated together with drying oils and similar neutral varnish materials. The viscosity achieved due to the interaction may even be so high that gelatinization of the reacting mass occurs.

Intensely hardenable resinoids as mentioned hereinbefore, which are insoluble in mineral spirit and e. g. derive from polyphenol-terpenes with a relatively large proportion of fixed phenol, can also be reacted with drying oils, forming thereby homogeneous masses, if they are previously combined with the resinoids derived from phenols in which only two of the reaction favorable positions (o, o and p) are unoccupied, and which carry at least one higher substituent of aliphatic, hydroaromatic or mixed aliphatic-aromatic nature having at least three saturated carbon atoms. We may combine the separately prepared and neutralized condensation product but we prefer to first combine the terpene phenol and the other phenol and to subject this mixture to simultaneous condensation, in the described manner, with formaldehyde. If we desire to obtain condensation products of higher condensation storages, e. g. of solid resinous consistency, we subject the condensation product to careful heating. This may be done before or after neutralization. The simultaneous condensation of the two types of phenols is also of advantage insofar as from many high molecular phenols of the above defined nature a homogeneous mixture with aqueous formaldehyde and alkalies may be easily obtained if condensed together with phenols of relatively low molecular weight.

The resinoids obtained from the mixture of phenols in the aforesaid manner, when reacted with drying oils, will as a rule bring about a still more intensive increase in viscosity than will the resinoids obtained from the co-employed phenols themselves, in which only two of the reaction favorable positions are unoccupied. Gelatinization of the reaction mixture (oils and resinoids) is brought about therefore with a still smaller proportion of the first named resinoids.

The relative quantity of the substituted phenol, the co-employment of which leads to an oil-compatible heat hardening condensation product, depends upon the nature of the high molecular phenol and also on the proportion of formaldehyde. The hereinbefore mentioned dihydroxy-diphenyl menthane necessitates e. g. the co-employment of 4-5 times the quantity of p-tertiary butylphenol or a similar phenol, if maximum quantities of formaldehyde are to be combined. A substantial reduction in the quantity of formaldehyde also enables the quantity of the butylphenyl or the like to be reduced. When employing terpene phenols containing a smaller proportion of combined phenol or deriving from certain phenol homologues, the relative quantity of the butylphenol or the like can in general be correspondingly reduced or may even be entirely omitted, as said already.

The resinoids, capable of being combined with drying oils, including both those obtained directly from the high molecular phenols and those obtained by the co-employment of distinctly substituted phenols such as p-butyl phenol, may also be combined with other practically neutral raw materials used in the varnish industry, such as neutral resins or resin acid esters, and also with waxes and the like, small quantities of such resinoids being sufficient to produce a considerable improvement in the properties of these products. Viscosity and hardness are, in particular, increased to a high degree.

If neutral resins, such as rosin esters, cumarone resins and the like, and also if castor oil are to be treated, it is in general sufficient, if a phenol is co-employed, which has only two unoccupied reaction favorable positions, provided such a co-employment is necessary at all, i. e. if the resinoid from the high molecular phenol does not lead directly to homogeneous reaction masses. The presence of a higher alkyl, or the like, as substituent in the co-employed phenol, is unnecessary in such cases. Thus, for example, o- or p-cresol or p-chlorphenol may also be co-employed.

Suitable mixtures of high molecular and low molecular phenols of this kind may be prepared in a simple manner in a single operation. We convert the phenol used in excess for preparing the terpene phenol, instead of eliminating it, into specially substituted phenols, such as desired, according to known methods. Such a modification of our process is particularly applicable when proceeding according to the first described method for preparing the terpene phenols, which method consists in using halogen compounds of the terpenes and metal halides as catalyst.

For illustration we mention the following methods which are adapted for converting the excess of phenol into suitably substituted phenols: Substituting an alkyl radical by means of an alkyl halide such as tertiary butyl etc. chloride, or by means of suitable olefines such as iso-amylene, in which cases aluminum chloride or a similar metal halide serves as catalyst; substituting chlorine, suitably by means of sulphuryl-chloride. According to these methods, correct proportions provided, the common phenol employed in excess is transformed into phenols which are substituted in one of the three reaction favorable positions (the substituent mostly entering into para-position). Provided the mixture of phenols is not intended to yield resinoids which are compatible with neutral varnish raw materials it is also possible to convert the common phenol, which has not entered into reaction, into special phenols, according to known methods, such as are obtained by condensation with ketones with the aid of hydrochloride acid. E. g. from suitable proportions of phenol and aliphatic ketones, as is known, dihydroxy-diphenyl alkanes are formed.

In some cases the phenol not entered into reaction may remain in the mixture but we prefer however to eliminate or to convert it as described above, since phenol and most of the common homologues cause disadvantageous yellowing phenomena.

The application of the condensation products for the preparation of varnishes etc. is not exhausted by the hereinbefore described features. Even very readily hardenable resinoids which cannot be directly combined with drying oils such as dihydroxy-diphenyl-menthane-polyalcohols, tolerate the addition of unusually large proportions of plasticizing substances, such as castor oil or liquid phthalic esters, without disintegration on hardening taking place, which is, for example, perceptible by the exuding of the castor oil etc. Resinoids as aforesaid mixed with suitable proportions of castor oil or the like may accordingly be employed as base for stove drying varnishes, enamels, etc., which become particularly hard, tough and plastic.

Intensely hardenable resinoids as aforesaid, in addition to being employed in the above described manner, may also be indirectly employed for preparing oil varnishes, by reacting them with relatively large quantities of resin acids, such as the fatty acids of natural fats and fatty oils, after which the still free carboxylic acids suitably are esterified in known manner. If the carboxylic acids comprise those derived from drying oils, interaction products are obtained, which directly possess drying properties, so that a further quantity of drying oils need not be added.

The new resinoids compatible with neutral substances may also be combined with mixed esters obtained e. g. from glycerine, phthalic acid and fatty acids of drying or non-drying oils, if desired also from natural resin acids, in order to form raw materials for varnishes or lacquers. Care must be taken to ensure that the mixed esters possess a low viscosity, since interaction with the resinoids brings about a substantial rise in viscosity, insofar as the hardening reaction is not intended to take place in the film (stove drying varnishes etc.) in the manner described in U. S. Patent No. 1,800,296. We mention also inter alia the interaction with products, which have been obtained from phthalic acid, glycerine and castor oil by heating for some time at 260–270° C. with or without the addition of other oils or resins.

The hardening condensation products may also be used in other cases in which extremely high molecular masses are desired. Thus they may serve as bases for the manufacture of molding or pressed articles, without or with filling materials or for other similar purposes. Particularly applicable for this purpose are condensation products which are obtained by condensing terpene phenols having several hydroxyphenyl groups in the molecule, with a considerable excess of formaldehyde over the equimolecular quantity, according to the particular process described above, which consists in using strong alkalies and subsequent neutralization. These condensation products exhibit an intense hardening capacity dependent on the proportion of formaldehyde combined, the hardening being also accelerated by catalysts e. g. acids or alkalies such as may remain from incomplete neutralization.

The condensation products of this kind are very useful for this purpose due to particular resistance of the hardened condensation product against chemical and other influences. Their compatibility with unusually large proportions of plasticizing agents, such as castor oil or liquid phthalic esters, etc., also after hardening has taken place, as mentioned already, also in this case constitutes a particular advantage. As a further advantage it should be pointed out again that our process enables the preparation of very pale non-yellowing condensation products.

Hardening condensation products which are compatible with drying oils or neutral resins may also be blended with such restricted proportions of said materials that gelatinization occurs on hardening. Suitable compositions of the latter kind may also be used for molding purposes and the like.

The following examples may serve for illustration. We wish it to be understood positively that they are not restrictive as to the proportion etc. used.

*Example 1*

Gaseous hydrogen chloride is passed into 100 parts by weight of a technical dipentene to the point of saturation. The increase in weight amounts to 40-50%. The dark brown liquid reaction product is distilled in vacuuo. During distillation inert impurities of the dipentene at first pass over. The fraction passing over between 110 and 118° C. (14 mms.) contains almost pure dihydrochloride.

209 gms. of this fraction are gradually introduced with constant stirring into 282 gms. of molten phenol in the presence of a few percents of aluminum chloride. After the last addition heating to 50-60° C. is continued for a further 16 hours. The escaping hydrogen is intercepted in a suitable receiver.

A vigorous current of steam is then passed through the thickly liquid reaction product, whereby the excess of phenol employed and a small quantity of dipentene, which has been reformed from the di-hydrochloride, pass over. The residue which amounts to 300 gms. is a light yellow, fairly hard resinous mass. A quantitative conversion of the di-hydrochloride employed with phenol would form 324 gms. of condensation product.

The white crystalline compound which separates out from the carefully dried product, particularly after the latter has been allowed to stand, on rubbing with solvents, such as alcohol, ether and chloroform, is in all probability (1.8) dihydroxydiphenyl-menthane (diphenol-menthane). This appears both from its yield as mentioned, and from its molecular weight as well as from its analysis. We found 81.26% C. 8.83% H. while 81.43% and 8.70% H. are calculated. After heating the crude product or the crystals to about 150° C. or more, the entire compound as a rule remains permanently resinous.

Owing to its ready solubility in alcohol and hydrocarbons of every kind and in drying oils, etc. as well as to its excellent high fastness, it may be advantageously employed as a varnish or lacquer resin. Its advantageous behavior when used for the preparation of oil varnishes, particularly China-wood oil varnishes, has been described above.

The product is, however, also very well adapted for condensation with aldehydes, particularly formaldehyde, since artificial resins may be obtained, which are suitable both for the lacquer or varnish industry and also for other known purposes such as molding articles and which are distinguished by their fastness to light and other advantageous properties.

E. g., 100 gms. of the crystalline diphenol-menthane are first dissolved in 50 gms. of benzene and 50 gms. of alcohol, and then reacted with 32 gms. of aqueous formaldehyde (40% vol.) with the addition of 5 gms. of concentrated hydrochloric acid. The condensation is completed after boiling the mixture for 6 to 8 hours under reflux condenser.

After removing the watery layer and evaporating the solvent in a suitable manner an almost colorless, very hard resin is obtained which melts between 115 and 130 C. It easily dissolves both in alcohol and in aromatic or hydroaromatic hydrocarbons, such as xylol or turpentine, as well as in drying oils. Oil varnishes prepared therefrom exhibit excellent drying properties and do not show any noteworthy yellowing on drying or later on. From these properties we conclude that the phenolic nuclei of the diphenol-menthane are substituted in the para-positions to the phenolic hydroxyl groups.

Also when condensing the non-purified resinous diphenol-menthane with formaldehyde in a way as described above a very pale resin having very similar properties is obtained. The proportion of formaldehyde suitably may be increased up to about 35 gms. in order to obtain a resin having a melting point as high as mentioned before.

When increasing the proportion of formaldehyde still more, up to about 40 gms., a still harder, extremely high melting resin is obtained which is only soluble in alcohol and acetone and the like, but not in hydrocarbons. With drying oils it may, however, be combined by employing high temperatures, such as are necessary to dissolve copals and the like in drying oils.

Still higher proportions of formaldehyde lead to insoluble infusible condensation products.

Similar resins are also obtained when replacing the aqueous formaldehyde by corresponding proportions of its anhydrous polymers. Solvents may be omitted in this case, and the catalyst considerably reduced. The condensation is suitably effected at temperatures between 100 and 160° C. The formaldehyde may also be replaced by acetaldehyde or other homologues or paraldehyde. The resins obtained, however, lack in hardness and light color as compared with those obtained from condensation with formaldehyde.

On the other hand, it should be mentioned that the aluminum chloride, when preparing the diphenolmenthane, may be replaced by zinc chloride, iron chloride etc. Also instead of primarily forming the dipentene dihydrochloride the dihydrobromide may be prepared and reacted with the phenol in the presence of corresponding metal bromides.

*Example 2*

A mixture of 500 gms. of o-cresol and 15 gms. of zinc chloride are added in small portions to 209 gms. of dipentene dihydrochloride (1 mol.).

The temperature is first maintained slightly above 40° C. and, after the vigorous reaction has abated, is raised to 90° C. and maintained at this point for several hours.

After the reaction mixture has been washed and the excess of cresol employed has been expelled in vacuo or with steam, 320 gms. of a light brown, solid resinous condensation product are obtained. The theoretical yield amounts to 352 gms.

If guajacol is used as starting material instead of o-cresol, a satisfactory yield of a condensation product of very similar appearance and quality is obtained.

The products obtained according to Example 2 are less light in color than the diphenol menthane obtained according to Example 1, but have similar advantageous properties to the latter, which render them suitable as varnish resins.

The high molecular phenols obtained according to this example may be condensed with aldehydes, e. g. by proceeding in the way described in Example 1.

100 gms. of high molecular phenol are condensed by means of a strong acid with 15 gms. of para-formaldehyde, or with 40 gms. of aqueous formaldehyde (40% vol.) in the latter case suitably in the presence of an inert solvent.

The resins finally obtained are less hard and of lower melting point and of darker color than the resin from diphenol menthane and formaldehyde described above, but nevertheless may be usefully employed in the manufacture of varnishes, particularly oil varnishes due to the other desirable qualities.

*Example 3*

On passing hydrogen chloride into American turpentine until an increase in weight of approximately 27% has been reached, a mixture of isomeric bornyl chlorides is obtained by molecular re-arrangement. Owing to their being comparatively difficultly saponifiable, the isomers can be separated with the aid of a current of steam into a relatively volatile crystalline chloride and a less volatile liquid chloride. Both isomers can be caused to interact with phenol, which is suitably employed in excess of the calculated quantity, with the aid of aluminum chloride, zinc chloride, iron chloride and the like or mixtures thereof as catalyst.

The reaction of these secondary chlorides proceeds considerably more slowly than with dipentene hydrochlorides, the halogen atoms of which are combined with tertiary radicals, and renders the use of higher temperatures advisable. An approximately quantitative conversion may, however, be obtained at about 70° C. or more and using excess of phenol with the crystalline bornyl chloride, particularly with zinc chloride. In the case of the liquid isomers the reaction mixture must be heated to the neighborhood of 100° C., without, however, effecting quantitative conversion.

In both cases there are obtained, after removing the starting materials which have not entered into reaction, fairly light colored, soft resinous terpene phenols, which are readily soluble inter alia in hydrocarbons of every kind and in drying oils The aldehyde condensation products prepared therefrom in any manner are also readily soluble in the aforementioned substances and therefore constitute satisfactory starting materials for oil varnishes. They are, however, less suitable than the products obtained, for example, according to Example 1, because they show yellowing phenomena even though only to a small degree.

A condensation product may be prepared from this high molecular phenol showing a remarkable hardening capacity and yet being compatible with drying oils and other neutral varnish bases when condensing it with formaldehyde by means of a strong alkaline catalyst and subsequent neutralization. E. g. 100 grms. of the high molecular phenol which may be regarded as substantially consisting of monohydroxy-phenyl camphane, are dissolved in an inert solvent, such as toluol or the like, and brought into contact with 75 grms. of aqueous formaldehyde (40% vol.) in the presence of about 8 grms. of sodium hydroxide or of another similar alkali. The ingredients are kept in mutual contact by shaking or stirring the reaction mixture. After several weeks most of the formaldehyde employed has been combined corresponding to about 2 mols. per 1 mol. of the phenolic substance employed. The time required for this combining may be reduced considerably by raising the temperature to about 50–60° C. or by employing a still larger excess of formaldehyde (aqueous or anhydrous) over the quantity which can be combined, and by increasing the proportion of the alkaline catalyst. A still higher rise of the temperature is possible but not advisable since it causes an undesirably high condensation stage (molecular weight) of the condensation product obtained if applied for a long period of time and destroys considerable quantities of the formaldehyde employed due to the Cannizzaro reaction.

After chemical combination of the formaldehyde and the phenol has taken place to the desired extent, the reaction mixture is slightly acidified and thoroughly mixed. The watery layer separated from the other which contains the condensation product which is dissolved in the water insoluble solvents co-employed. The separation may be promoted by the addition of auxiliary materials in known manner.

After evaporating the solvent (toluol) a fairly pale solid resin is obtained which is easily soluble i. a. in hydrocarbons and drying oils. When heating a resin-oil solution (e. g. consisting of 2 parts of linseed oil and 1 part of resin) to temperatures above about 160° C., suitably finally to about 220–240° C., a considerable reaction (foaming) is observed due to the formation of water. The reaction is accompanied by a substantial increase in viscosity. When reducing the proportion of the linseed oil to only about 1 part, the viscosity of the reaction mixture becomes so high that gelatinization occurs.

Such a gelatinization is more readily obtained the higher the viscosity of the oil employed. Thus e. g. a thickened drying oil (so called bodied oil or "stand oil" obtained by polymerization on heating) leads to a gelatinous mass even when heated with only small proportions of the resin (such as 1/10 or somewhat more) in the way as described above. This peculiar behavior of the resin is due to its resinoid (hardening) nature and corresponds with the behavior of the resinoids described in the U. S. Patents No. 1,800,295 and No. 1,800,296. This phenomenon must not be confused with the increase in viscosity (leading finally to gelatinization) each drying oil undergoes when subjected to heat for a sufficient time, usually at temperatures of about 280° C. or higher. (As is known, China-wood oil gelatinizes after several minutes, Perilla oil after about 5 hours, linseed oil after about 10 hours etc.)

Reaction products obtained from suitable proportions of the resin and drying material or thickened oils serve for the preparation of varnishes of particularly high resistance. Those varnishes should be particularly mentioned which are combined from reacting China-wood oil with the resin on account of the particular hardness, high gloss and extreme resistance peculiar to the films thereof.

The hardening nature of the resin and the degree thereof can also be recognized in an apparent way by the high melting point peculiar to interaction products of even relatively small proportions of the resin with common neutral resins such as rosin glycerine ester. Thus, e. g. 3–4 parts of the latter (melting at 67–75° C.) and 1 part of the phenolic resin when heated together at temperatures of about 240° C. or more, yield a resin melting at about 100–120° C. Far smaller proportions of the rosin ester lead to extremely high melting, already gelatinous interaction products.

The phenolic resin, on the other hand, does not distinctly show its hardening character when heated alone. Careful elimination of the alkaline catalyst provided, the resin may be heated to quite high temperatures and for a considerable time without being converted into an insoluble and infusible product. Thus, e. g., it may be exposed to a flame without acquiring a carbonized crust.

The bornyl chlorides which according to this example are obtained from treating American oil of turpentine with hydrogen chloride, may also be obtained from borneol and gaseous or aqueous hydrochloric acid according to known methods.

The oil of turpentine employed on sufficiently continued treating with hydrogen chloride, leads as is known, by further molecular re-arrangement, to dichloro-menthane which is identical with dipentent-dihydrochloric used in Examples 1 and 2.

The balsamic turpentine oil may be replaced by such turpentine oils as are obtained as by-products in the manufacture of cellulose, more particularly from processes in which are used alkali hydroxides, sulphides and sulphates.

*Example 4*

500 grms. of a technical mixture of meta- and para-cresol, 10 grms. of aluminum chloride and 140 grms. of a mixture of dipentene hydrochlorides (containing about 40 grms. of combined hydrogen chloride) are brought together and gently warmed. As soon as distinct evolution of hydrogen chloride is observed, 500 grms. of technical dipentene are added in small portions. Each addition is at first followed by an exothermic reaction and each further addition is delayed until hydrogen chloride is again evolved. Finally the mixture is heated to 60–65° C. for a further 40 hours.

After further working up the crude condensate as in Example 1, 905 grms. of a light brown, resinous, solid condensation product, 70 grms. of dipentene fractions which have not taken part in the reaction and 100 grms. of cresol which have not taken part in the condensation are obtained. The m-cresol content of the latter is considerably less than that of the initial mixture.

The resinous condensation product has properties similar to those of the high molecular phenols obtained according to Examples 1 and 2 and may be advantageously employed as a lacquer or varnish resin, particularly for oil varnishes.

The proportion of dipentene hydrochlorides used may be diminished considerably, the proportion of dipentene being enlarged correspondingly; the aluminum chloride may be advantageously replaced by other metal halides, such as zinc chloride or ferric chloride or mixtures thereof. Also the proportions, temperature, time etc. may be varied considerably.

The high molecular phenol may be condensed with aldehydes yielding also resins useful for the varnish manufacture.

Thus, e. g., a very hard resin is obtained when condensing about 3 parts of the phenol with about 1 part of aqueous formaldehyde (40% by vol.) in a manner as described in Example 1, using a strong acid as catalyst. The resin is readily soluble in oil of turpentine and in drying oils and exhibits highly appreciable properties similar to those of the resin obtained according to Example 1 from the crude diphenol-menthane (100 parts) and formaldehyde (35 parts). A heat hardening resin readily soluble in drying oils is obtained from about 10 parts of the high molecular phenol diluted in a suitable solvent and 6 parts of formaldehyde (40% vol.), the condensation being performed by means of sodium hydroxide (1 part) or the like and subsequent neutralization in the manner described in Example 3 at ordinary or only slightly increased temperature. After several weeks the formaldehyde employed is almost completely combined. On increasing the quantity employed no more is combined, but the time required for combining is shortened.

The condensation product freed from the solvents etc. externally resembles the high molecular phenolic compound from which it derives. It brings about very similar phenomena to those produced by the heat hardening resin, obtained according to Example 3. The absence of yellowing phenomena in oil varnishes, which have been prepared with the resin, is also very noticeable.

The condensation of the high molecular phenol obtained according to this example, to a heat hardening formaldehyde condensation product may be facilitated by employing therewith a low molecular phenol. E. g. 1 part of the high molecular phenol and 1 part of p-cresol are melted together and condensed with 2 parts of formaldehyde (40% vol.) by means of about 0.2 part of sodium hydroxide or the like at ordinary temperature for about 2 weeks whereupon the catalyst is neutralized. The soft condensation product obtained may be converted into a solid resin by suitably heating it above 100° C. Both condensation products are heat hardening and dissolve in drying oils when warmed and form homogeneous reaction masses therewith by application of heat above 160° C.

When replacing the p-cresol by suitable homologues, such as p-tertiary butyl phenol, the condensation products obtained are soluble in drying oils in the cold.

The high molecular phenol which served to form a heat hardening oil soluble formaldehyde condensation product in the way described above may be replaced by a similar product obtained according to Koenigs by diluting dipentente (1 part) (the proportions may also be the same as mentioned above) in glacial acetic acid (about 10 parts) and adding sulphuric acid (about 2 parts). The reaction mixture is allowed to stand for several days at ordinary temperature, whereupon it is poured into water, repeatedly washed and finally freed from cresols and dipentene having not entered into reaction, and from volatile by-products still present by means of a vigorous steam current. The high molecular phenol when condensed with formaldehyde, behaves similarly to that obtained by means of hydrogen halide addition products etc., its yield, however, is only poor and its color rather dark.

*Example 5*

Hydrogen chloride is passed at about 40° C. into American pine oil, which consists predominantly of tertiary alcohols and of sesquiterpenes until an increase in weight of 55% has been reached. The product (100 parts) freed from the aqueous portion formed during the conversion, is condensed at 60–80° C. with an equal quantity by weight of phenol in the presence of zinc chloride (1 part). A reaction can be observed even before the addition of the catalyst, which after the addition proceeds very vigorously and is completed in a few hours.

After removing the phenol employed in excess, and the parts of the terpene compound which have not entered into reaction, 110 parts of a light colored condensation product of hard resinous nature are obtained.

Instead of employing all the conversion product from the pine oil and the hydrogen chloride for the condensation, it may also be cooled down to about 10° C., setting thereby to a crystalline mass. About half of the weight of this mass may be isolated in the form of pure white crystals by suctional filtration. These mainly consist of dipentene di-hydrochloride. If the crystalline mass is reacted with phenol as hereinbefore described, an almost colorless, very hard resinous high molecular phenol is obtained.

Light colored very light-proof products are also obtained with homologues of phenol.

The products obtained from common phenol in particular are directly suitable as varnish or lacquer resins exactly like the resinous high molecular phenol obtained according to Example 1. Also when condensing with formaldehyde it behaves very similarly.

Instead of distilling off the phenol, which has not entered into reaction, it may be converted by substitution into a homologue having advantageous properties. About 50 parts of tertiary butyl chloride are, for example, gradually added to the reaction mixture, in order to introduce the tertiary butyl group into the nucleus of the phenol. A specific addition of further quantities of catalyst, such as aluminum chloride and the like, is unnecessary.

The terpene phenol compound is unaffected by the butylation and finally a mixture of about 3/5 parts of terpene phenol and 2/5 parts of p-tertiary butyl phenol is obtained, which has merely to be washed in order to separate the catalyst.

This mixture is particularly suitable for the production of oil-soluble aldehyde resins. If oil-soluble condensation products having a very pronounced hardening capacity are aimed at, a further portion of butyl phenol or of an equivalent homologue is added whereupon this mixture is subjected to condensation with about an equal quantity of formaldehyde (40% vol.) by means of a strong alkali and subsequent neutralization, as described in Example 4. The condensation products are soft or solid resins, the consistency depending on the temperatures employed before or after neutralization, as has been described in Example 4.

When reacting such a condensation product with drying oils, e. g. with 4 times its weight of linseed oil, a still larger increase in viscosity is to be observed than is the case with the hardening condensation product obtained according to Examples 3 and 4 or with a resinoid obtained in a corresponding way from p-tertiary butyl phenol alone.

If on the other hand a hardening condensation product is aimed at which is compatible with castor oil or neutral resins in any proportion, the further addition of butyl phenol or the like may be omitted.

If the high molecular phenol obtained from phenol and the pine oil as starting materials (after removing the excess of phenol etc.) is condensed alone in a corresponding way or in a modified way such as described in Examples 3 and 4 i. e. using inert solvents as auxiliary materials, an intensely hardening resin is obtained. This cannot be reacted with drying oils nor with neutral resins such as rosin esters or castor oil in any proportion into homogeneous masses.

The hardening resin, when exposed to a flame, rapidly gets a carbonized crust if the alkaline catalyst has been removed most carefully.

Its very pronounced hardening capacity may be utilized in various ways both in the varnish field and in the manufacture of molding articles, insulating materials and the like. It is compatible with many plasticizers such as castor oil, liquid phthalic esters, liquid abietic esters etc. It is remarkable and very advantageous that such plasticizer may be added in quantities up to 50% by weight of the resin without danger of separation taking place on hardening. The conversion into the infusible insoluble stage is effected by heating the resin etc. to about 150° C. for about 15–30 minutes.

The excellent fastness to light of all products derived from the interaction of pine oil and phenol should be mentioned.

*Example 6*

An almost colorless and very light-proof resin having an intense hardening capacity is obtained when condensing the crystalline or resinous diphenolmenthane such as prepared according to Example 1 with formaldehyde by means of alkali in a way corresponding to Example 3, 4 or 5:

100 parts of diphenolmenthane
200 parts of formaldehyde (40% vol.) and
10 parts of sodium hydroxide are heated to about 40° C. and stirred until a clear solution is obtained. After two weeks the solution is acidified and the resinous condensation product, which can be kneaded at about 50° C., is repeatedly washed. It is finally pulverized and dried.

A determination of the formaldehyde in the total aqueous fractions after acidifying and on washing shows that exactly half of the formaldehyde employed has been consumed. This indicates that 4 mols. of the formaldehyde have been combined by 1 mol. of the phenolic compound (molecular weight of dioxy-diphenyl menthane=324). The condensation product is accordingly to be regarded as a diphenolmenthane-polyalcohol (tetra).

The quantity of formaldehyde employed can therefore be reduced to the maximum which can be combined, without noticeable reduction of the hardenable qualities of the condensation product taking place.

The condensation with formaldehyde may also be performed in a modified manner, i. e. in the presence of solvents as described in Examples 3, 4, 5. The temperature may be somewhat elevated in order to shorten the time necessary to combine the formaldehyde.

The resin may be utilized for the same purposes and in a similar way as is the hardening resin obtained from the high molecular phenol according to the foregoing example. It also stands an addition of 30 to 40% of castor oil or other plasticizers without separation taking place on hardening.

After combining (blending) the condensation product (one part) with about 4 parts of a phenol-polyalcohol formed from formaldehyde and e. g. p-cyclohexylphenol it may be used for reacting with drying oils. The soft mixture of condensation products may also be converted into a solid resin by carefully heating before being reacted with drying oils.

If only treating neutral resins such as rosin-glycerine-esters or the like is intended it is sufficient to blend the intensely hardening resin with phenol (poly) alcohols (resinoids) derived from such phenols as p-cresol, p-chlorophenol etc. The increase in melting point, hardness and viscosity is greater than that obtained from an equal proportion of the phenol alcohols used for blending.

The polyalcoholic resin obtained from the diphenol-menthane may also be used for varnish etc. purposes, without the mediation of other phenol condensation products when reacting it with multiple proportion of high molecular carboxylic acids, such as natural resin acids (rosin) or fatty acids, particularly those deriving from drying oils. Carboxylic groups still present after the reaction suitably are neutralized by esterification in known manner.

When reducing the formaldehyde below the quantity which corresponds with 4 mols per 1 mol of the high molecular phenol, the hardening character of the condensation product obtained is more and more diminished. With about 1½ mol. a condensation product is obtained after neutralization, which on heating can not be converted into an infusible product; the melting point, it is true, is raised, whereby the product becomes very similar to the high melting resin obtained by means of an acidic catalyst according to Example 1.

*Example 7*

100 parts of phenol and 200 parts of technical dipentene of which a small part was first saturated separately or in the presence of the phenol, with hydrogen chloride, are condensed at 50-70° C. in the presence of 3 parts of zinc chloride.

If the reaction mixture is subjected after a few hours to steam distillation, about 250-255 gms. of a soft or viscous residue are obtained. If heating is continued for a further 48 to 72 hours, preferably at somewhat higher temperatures, and after increasing the catalyst, about 280-285 grms. of a residue remain after steam distillation in the form of a solid resin. About 15 gms. of inactive fractions of the technical dipentene and a quite small quantity of unused phenol pass over with the steam. The solid resin has far higher molecular weight than the soft or viscous one primarily obtained. It is noticeable that in the condensation product far more than one mol. of the terpene per one mol. of phenol is combined.

Since the reaction mixture in the subsequent course of the reaction is very viscous, even at, for example 100° C., it is advisable to add an inert solvent, such as a saturated aliphatic or an aromatic hydrocarbon. A diluent as aforesaid is also advantageous for the convenient washing out of the catalyst etc.

The relative quantity of the dipentene may be still further increased, whereby condensation products and subsequently polymerisation products are obtained, in which still much less than one mol. of phenol is combined with one mol. of the original dipentene employed. Such products may have a soft to thickly oily consistency. Solid products may be directly employed as varnish resins as, for example the product obtained according to Example 1.

The condensation reaction, instead of being initiated with dipentene hydrochlorides, may be initiated with the aid of a small quantity of another reactive hydrocarbon halide, for example tertiary-amyl-chloride. As soon as the reaction is in the progress with elimination of hydrogen chloride, the addition of the dipentene is commenced. A small quantity of tertiary amyl phenol is, of course, present in the final condensation product.

A heat hardening oil soluble resin e. g. is obtained when condensing a solid high molecular phenol (prepared as described above from 2 parts of phenol and 4 to 5 parts of dipentene) with about 4 parts of formaldehyde (40% vol.) by means of strong alkali etc. in a way as described in Example 3 and in other examples. The resin finally obtained shows a very distinct hardening capacity. Its compatibility with neutral varnish materials including drying oils is surprising, for the phenolic body from which it derives at least mainly consists of a polyphenol terpene having more than two unoccupied reaction favorable positions.

If reducing the proportion of dipentene employed to such an extent that approximately equimolecular quantities of phenol and dipentene are chemically combined in the solidified resinous terpene phenol, the formaldehyde condensation product even when prepared analogously, exhibits such an intense hardening capacity that no homogeneous interaction products can be obtained with neutral resins or oils. On the contrary the not yet solidified phenol formed from the same proportion by only a short interaction or when proceeding without the aid of a metal halide, does not lead to formaldehyde condensation products of any pronounced hardening character. These facts are very remarkable.

*Example 8*

From dioxybenzenes and terpenes etc. high molecular phenols are obtained capable of forming formaldehyde condensation products which exhibit a particularly high hardening capacity. A considerable advantage consists in that the proportion of the terpene employed or combined may even be relatively very large.

E. g. 1 part of resorcin and 3 parts of dipentene are reacted together in a manner entirely analogous to reaction of the phenol and the dipentene in the foregoing example. After removing inert portions of the dipentene a sticky reaction product is finally obtained. This leads to condensation products of intense hardening capacity e. g. when using hexamethylene tetramine as active methylene compound or when using formaldehyde and e. g. proceeding in a corresponding way as described in Example 3. The high elasticity the resins show after hardening has taken place, is of particular advantage. Considerable proportions of oils including drying oils may be added in order to still further increase the elasticity, without decomposition taking place on hardening.

Example 9

High molecular phenols which are particularly rich in phenolic benzene rings, are obtained when proceeding in the following way:

A slow current of chlorine is passed for 10 hours into a solution of 209 grms. of dipentene di-hydrosulphide in carbon disulphide. A light honey-yellow colored substitution product (about 240 grms.) which can be almost completely distilled in vacuo up to 120° C., is obtained.

If 100 grms. of the distilled product are condensed with 200 grms. of phenol in the presence of a suitable catalyst, such as zinc chloride, or aluminum chloride, about 200 grms. of an orange-yellow, hard resinous condensation product are obtained after removing the catalyst and the excess phenol. It is soluble in all the usual solvents as well as in drying oils and is light-proof.

Both the increase in weight on chlorination and also the yield of high molecular phenolic products indicate that in the latter, three phenol nuclei are combined with the menthane. The hydrogen atom at the tertiary 4-carbon atom was presumably substituted by chlorine, so that the tri-tertiary chlorine formed yielded the light-fast polyphenolic compound.

In this case also the excess phenol instead of being removed can be converted into special derivatives which are left in the reaction mixture. 29 grms. of acetone (½ mol.), or a correspondingly larger quantity of a homologue, or a technical mixture of homologues, such as a mixture of methyl butyl ketone and ethyl propyl ketone, or cyclohexanone, or a methyl cyclohexanone mixture are, for example, added and the reaction mixture is heated for a few days to 40-50° C. The corresponding dihydroxydiphenyl alkane or dihydroxydiphenyl-cycloalkane is formed thereby from the phenol and the ketones under the catalytic influence of the still remaining hydrogen chloride. When empolying larger quantities or ketones, soft, resinous compounds of analogous constitution but higher molecular weight are formed.

The mixture of the phenolic compound, like the terpene phenolic compound itself, may be employed inter alia for the preparation of phenol formaldehyde condensation products which do not turn yellow.

Resins which exhibit a particular high hardening capacity, are obtained also from this high molecular polyphenolic body e. g. when subjecting it to condensation with suitable proportions for formaldehyde in a way as particularly described in Examples 3 and 6.

Example 10

Hydrogen chloride is passed with cooling into 150 grms. of cumin (caraway seed) oil, until 100 grms. have been absorbed. On strong cooling if necessary after previous distilliation in vacuo, a crystalline mash is obtained, from which almost pure dipentene di-hydrochloride can be separated.

The portion which remains liquid yields, on condensation with phenol (in equal parts) and using zinc chloride as catalyst and subsequent working up and removal of the excess phenol as in the preceding examples, a light brown solid, resinous condensation product.

This product may be employed as a varnish resin or may be condensed with aldehyde in the most various ways using widely varied proportions. Also condensation products of very pronounced hardening capacity are obtained e. g. when employing the methods particularly described in Examples 3 and 6.

Example 11

Phenol (4 parts) and isoprene (1 part) are gently warmed in a flask provided with a reflux condenser until the first dissolves, zinc chloride (0.1 part) is added and a slow current of hydrogen chloride is passed through for 1 hour. The temperature is first kept below 25° C. by intense cooling, after several hours gradually raised and finally kept at 70-80° for 12 hours after all of the isoprene has entered into reaction. The reaction mixture thereupon is treated in a way as described in Example 1. The high molecular phenol (approximately 3 parts) represents a light brown solid resin which may be used for preparing varnishes or for condensation with aldehydes yielding thereby resins of the most various properties and applicability.

Also an intensely hardening resin is obtained from condensation with suitable proportions of formaldehyde by means of strong alkalies, an adapted way being described in Example 3.

High molecular phenols of an external appearance similar to that of phenolic bodies such as obtained from isoprene and phenol are obtained from various homologues of the latter. As a rule, however, they are less adapted to form intensely hardening formaldehyde condensation products.

Example 12

Hydrogen chloride is passed with cooling into 152 grms. of geraniol. The proportion taken up which amounts to about 115 grms., indicates that quantitative addition has taken place as well as the hydroxyl group has also been esterified. On distilling in vacuo the main quantity passes over between 115 and 125° C.

If the product is condensed with an equal quantity of phenol with the aid of a catalyst, such as zinc chloride etc., almost quantitative substitution takes place and a red-brown fairly soft resinous product is obtained.

The isomeric linalool takes up less hydrogen chloride and yields a smaller quantity of interaction product, which is thickly liquid and dark green.

Aldehyde condensation products may be obtained from the high molecular phenols having the most various properties according to the proportions, the catalyst etc. used. An intensely hardenable resin is obtained when suitable proportions of formaldehyde are condensed by means of a strong alkali with the high molecular phenol deriving from geraniol, as described above, and being particularly rich in hydroxy phenyl groups.

Example 13

Hydrogen chloride is passed into a mixture of 100 grms. each of phenol and copal oil, derived from the destructive fusion process of Kongo copal, until an increase in weight of about 6 grms. has taken place. The passage of hydrogen chloride may also be continued to the point of saturation, about 20 grms. being necessary therefore. Condensation is thereafter effected at 60–80° C. for 24 hours with the aid of zinc chloride or aluminum chloride or similar catalysts. After suitable working up, about 120 grms. of a resinous condensation product are obtained in which about 3/8 parts by weight of phenol are chemically combined with 5/8 parts by weight of reactive portions of the copal-oil.

The condensation product shows a distinctly phenolic character and may be employed, for example, for the production of aldehyde resins readily soluble in oil or be used directly as a varnish resin. Condensation products of similar consistency are also obtained from phenol homologues and copal oil. The copal oil may, however, be replaced by the oily decomposition products which result on heating recent soft resins, such as ordinary colophony, to temperatures above 300° C. and which are likewise rich in unsaturated compounds. The formation of decomposition products as aforesaid is frequently unavoidable when fusing colophony. E. g. for preparing esters, owing to local overheating, and consequently like copal oil they constitute a very cheap waste material.

Condensation with formaldehyde leads to resins of various properties. When employing e. g. the method described in Example 3, an oil-soluble heat hardening resin is obtained from condensation with formaldehyde.

*Example 14*

220 grms. of bromine are slowly dropped into 100 grms. of technical dipentene with intense cooling below −10° C. The reaction mixture becomes very dark after the first portions of bromine have been added, but becomes pale again during the later course of adding. The bromine is chemically combined by addition, a small portion of the technical dipentene, however, reacts with substitution, hydrogen bromide being formed thereby.

The addition and conversion product is reacted with 500 grms. of phenol with the aid of 2 grms. aluminum bromide. After suitably removing the catalyst and the phenol and dipentene having not entered into reaction or being recovered, about 310 grms. of a dark colored hard resinous body are obtained showing distinct phenolic character.

It may be used as such for the preparation of varnishes or serve to produce condensation products with aldehydes, e. g. such of intensely hardening character, the method described in Example 3 being suitably employed.

We wish to repeat that the preceding examples are to be regarded as illustrative only, but not as restrictive. The proportions, catalyst and other auxiliary materials, temperature, time and many other conditions may be varied to a very considerable extent. While the application of diminished pressure is preferable in many cases as said in the examples, increased pressure may also be applied advantageously in many cases, such as the condensation with aldehydes.

For producing the high molecular phenols we prefer the method of first separately or intermediately preparing halogen compounds of the terpenes etc. and then reacting these with the phenols in the described ways. It is to be regarded as advantageous that the interaction may be carried out in a common inexpensive iron vessel since the iron is only very slightly affected by the anhydrous hydrogen halides. Very probably it even acts catalytically in an advantageous way due to the formation of iron halides.

Among the different ways of forming formaldehyde condensation products from the high molecular phenols the method is of particular importance, according to which strong alkalies and subsequent neutralization are employed, such as is described in detail in Examples 3, 4, 5 and 6, the formaldehyde preferably being employed in considerable excess over the equimolecular quantity.

In the following claims the term "terpene" is intended to comprise: unsaturated, and saturated, oxygen-free and oxygen-containing organic compounds of vegetable origin which are derived from (a) alicyclic (mono- and polycyclic) terpenes, sesquiterpenes and polyterpenes in the narrow sense of the terms, (b) acyclic (aliphatic) terpenes or terpenogenes i. e. compounds which are readily converted into alicyclic terpenes etc. and (c) compounds of undefined nature which easily are obtained by common decomposition, including depolymerization, from alicyclic compounds enumerated sub (a).

We claim:

1. A process which comprises condensing together in the presence of a condensing agent capable of eliminating hydrogen halide (1) a poly-halogenated terpene and (2) a phenol in the proportion of substantially more than one molar weight of the phenol to each molar weight of the poly-halogenated terpene whereby substitution of the halogen atoms by phenolic aromatic radicals takes place with elimination of hydrogen halide, continuing the condensing action at elevated temperature until a condensation product is obtained consisting essentially of the terpene and the phenol in chemical combination in substantially the aforesaid proportion and then condensing the said condensation product with an aldehyde.

2. A process according to claim 1, in which the terpene contains two double bonds.

3. A process according to claim 1, in which the terpene is dipentene.

4. A process in accordance with claim 1, in which the step of condensing with an aldehyde is conducted by the aid of a strong alkali catalyst and subsequently removing, mainly at least, the said alkali catalyst.

5. A process in accordance with claim 1, in which the step of condensing with an aldehyde is conducted by the aid of a strong alkali catalyst at a temperature not substantially above ordinary temperature, for a prolonged period of time ranging up to several weeks and subsequently removing, mainly at least, the said alkali catalyst.

6. A process in accordance with claim 1, in which an unreacted substituted phenol of relatively low molecular weight is incorporated in the mixture preceding the step of condensing with the aldehyde and is simultaneously condensed therewith, and in which the aldehyde condensation step is conducted by the aid of a strong alkali catalyst, the main portion, at least, of the said alkali catalyst being subsequently removed from the final condensation product.

7. A resinous product obtained from condensing together in the presence of a condensing agent capable of eliminating hydrogen halide (1) a poly-halogenated terpene and (2) a phenol to form a condensation product consisting essentially of the terpene and the phenol in chemical combination with each other in the proportion of substantially more than one molar weight of the phenol to each molar weight of the terpene and then condensing the said condensation product with an aldehyde.

8. A product according to claim 7, in which the terpene is dipentene.

9. A product according to claim 7, in which the terpene is dipentene and the phenol is hydroxybenzene.

10. A condensation product in accordance with claim 7, in which the primary or first mentioned condensation product is a solid resinous compound consisting essentially of dipentene and phenol in chemical combination and in which the aldehyde contained in the final condensation product is formaldehyde and is present in the said final condensation product in chemically combined form in substantial excess over the equimolecular quantity of the chemically combined phenol up to 2 mols of formaldehyde per each mol of phenol.

11. A product according to claim 7, in which the terpene is dipentene, the phenol is hydroxy benzene and the aldehyde is formaldehyde.

HERBERT HÖNEL.
ALOIS ZINKE.